United States Patent
Helander et al.

(10) Patent No.: US 10,389,190 B2
(45) Date of Patent: Aug. 20, 2019

(54) ELECTRIC MACHINE

(71) Applicant: ABB Schweiz AG, Baden (CH)

(72) Inventors: Joonas Helander, Helsinki (FI);
Moritz Grün, Espoo (FI); Ari Vartiainen, Helsinki (FI)

(73) Assignee: ABB Schweiz AG, Baden (CH)

( * ) Notice: Subject to any disclaimer, the term of this patent is extended or adjusted under 35 U.S.C. 154(b) by 369 days.

(21) Appl. No.: 15/128,839

(22) PCT Filed: Mar. 24, 2015

(86) PCT No.: PCT/EP2015/056201
§ 371 (c)(1),
(2) Date: Sep. 23, 2016

(87) PCT Pub. No.: WO2015/144670
PCT Pub. Date: Oct. 1, 2015

(65) Prior Publication Data
US 2018/0198328 A1      Jul. 12, 2018

(30) Foreign Application Priority Data
Mar. 26, 2014   (EP) ..................................... 14161738

(51) Int. Cl.
*H02K 1/18*      (2006.01)
*H02K 5/02*      (2006.01)
(Continued)

(52) U.S. Cl.
CPC .............. *H02K 1/185* (2013.01); *H02K 1/182* (2013.01); *H02K 5/02* (2013.01); *H02K 5/04* (2013.01); *H02K 5/26* (2013.01); *H02K 2213/12* (2013.01)

(58) Field of Classification Search
CPC .......... H02K 1/185; H02K 1/182; H02K 5/02; H02K 5/04; H02K 5/06; H02K 5/15; H02K 5/18; H02K 5/26; H02K 2213/12
(Continued)

(56) References Cited

U.S. PATENT DOCUMENTS

| 102,406 A | 4/1870 | Katz |
| 1,689,503 A * | 10/1928 | Savage .................. H02K 1/185 |
| | | 310/216.129 |

(Continued)

FOREIGN PATENT DOCUMENTS

| DE | 8805143 U1 | 7/1988 |
| DE | 4115936 A1 | 11/1992 |

(Continued)

OTHER PUBLICATIONS

European Patent Office, International Search Report & Written Opinion issued in corresponding Application No. PCT/EP2015/056201, dated May 3, 2016, 11 pp.
(Continued)

*Primary Examiner* — Quyen P Leung
*Assistant Examiner* — Minki Chang
(74) *Attorney, Agent, or Firm* — Taft Stettinius & Hollister, LLP; J. Bruce Schelkopf

(57) ABSTRACT

The electric machine comprises a rotor, a stator surrounding the rotor and a support structure. The stator has a longitudinal center axis and is supported on the support structure with support elements. The stator comprises a cylindrical stator core having a laminated structure and slots for a stator winding and a stator frame surrounding the stator core. The stator frame comprises two opposite end constructions and at least one frame plate located between the end constructions. A support element is located between each end construction and the adjacent frame plate and between adjacent (Continued)

frame plates. The support element is made of cast iron and attached to the end constructions, the frame plate and the support structure with fastening means based on a compression joint, whereby the stator frame becomes attached to the support structure via the support elements.

17 Claims, 7 Drawing Sheets

(51) Int. Cl.
  *H02K 5/04* (2006.01)
  *H02K 5/26* (2006.01)
(58) Field of Classification Search
  USPC .................................................. 310/216.118
  See application file for complete search history.

(56) References Cited

U.S. PATENT DOCUMENTS

| | | | |
|---|---|---|---|
| 3,805,102 A | 4/1974 | Vöckler | |
| 4,207,484 A | 6/1980 | Krecker | |
| 5,630,461 A * | 5/1997 | Cochimin | B22C 9/046 |
| | | | 164/34 |
| 6,091,177 A * | 7/2000 | Carbonell | H02K 5/24 |
| | | | 310/426 |
| 2013/0229084 A1* | 9/2013 | Allen | H02K 1/16 |
| | | | 310/216.008 |
| 2013/0300046 A1* | 11/2013 | Vitello | H02K 15/0006 |
| | | | 269/55 |
| 2014/0367971 A1* | 12/2014 | Tanavde | H02K 1/185 |
| | | | 290/52 |

FOREIGN PATENT DOCUMENTS

| | | |
|---|---|---|
| DE | 19743610 A1 | 4/1999 |
| GB | 102406 A | 4/1917 |
| GB | 540199 A | 10/1941 |
| GB | 2470467 A | 11/2010 |
| WO | 0057535 A1 | 9/2000 |

OTHER PUBLICATIONS

European Patent Office, Search Report issued in corresponding Application No. 14161738.1, dated Sep. 9, 2014, 4 pp.

* cited by examiner

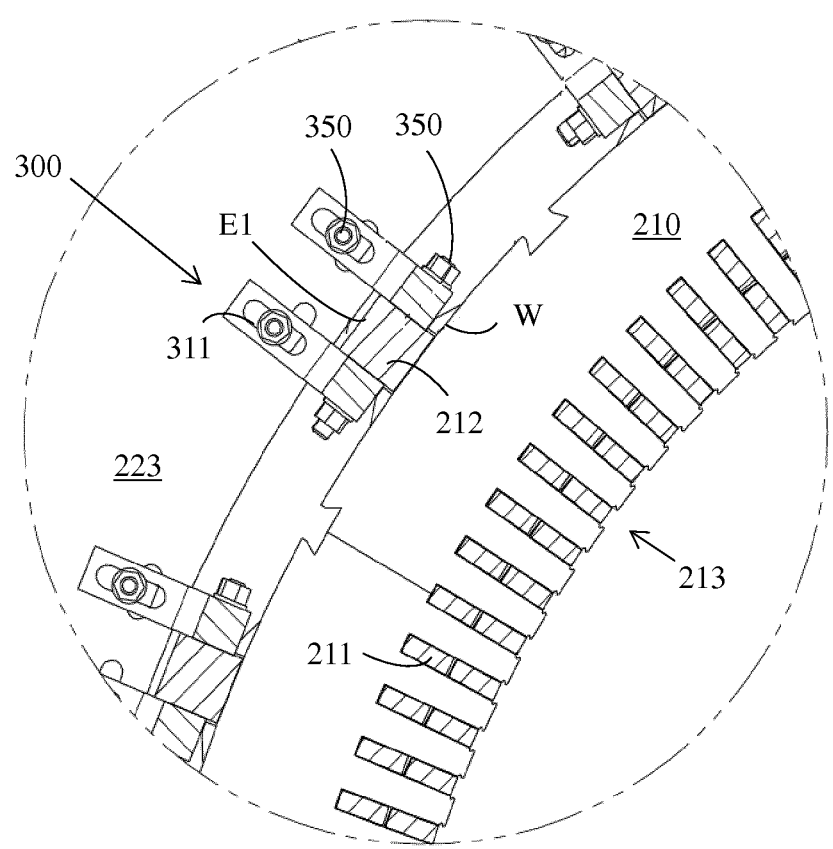
Fig. 8
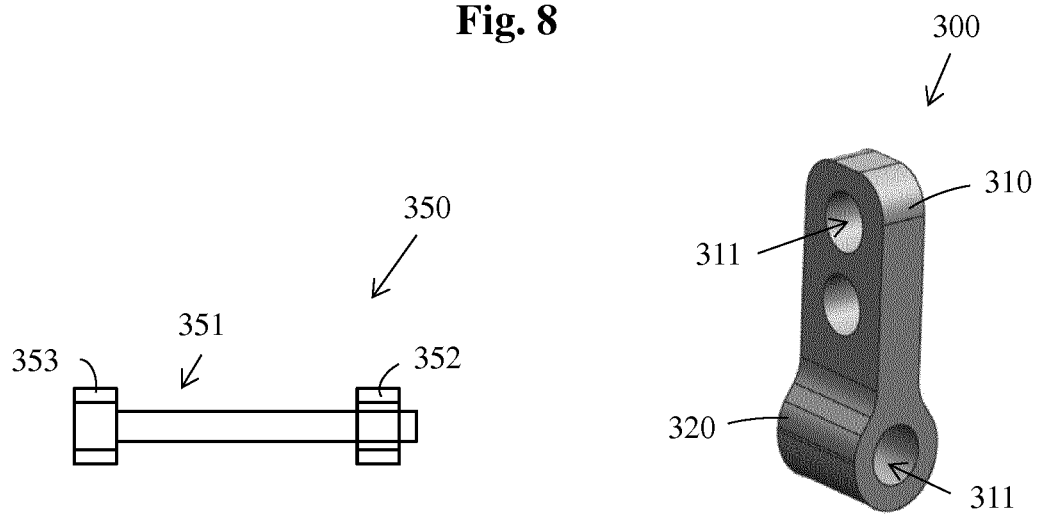
Fig. 9  Fig. 10

ELECTRIC MACHINE

FIELD OF THE INVENTION

The invention relates to an electric machine according to the preamble of claim 1.

The electric machine comprises a rotor and a stator surrounding the rotor. The stator comprises a longitudinal centre axis, a horizontal centre plane passing through the centre axis of the stator, and a vertical centre plane passing through the centre axis of the stator. The stator comprises further a cylindrical stator core and a stator frame surrounding the stator core. The stator core comprises a laminated structure, a stator winding, and back beams attached to an outer surface of the stator core and extending in the axial direction of the stator. The stator frame comprises two opposite end constructions located at an axial distance from each other.

BACKGROUND ART

Electric machines i.e. electric motors and electric generators are used in many applications. Electric motors are used to drive different kinds of machines and electric generators are used to produce electric power. The power sources used to drive electric generators vary. Steam is one common power source used in electric power plants to drive turbines, whereby the turbines drive the electric generators. Combustion engines can on the other hand be used to drive generators. The combustion engine and the generator are often mounted on a common platform forming a support structure. The whole unit comprising the combustion engine and the electric generator on the common support structure can then be transported to the site and positioned on the floor in the power building. The installation of such a unit is thus very fast.

The stator in an electric generator comprises normally an annular stator core and a stator frame surrounding the stator core. The inner surface of the stator core comprises slots opening into the inner surface of the annular stator core. The stator winding is positioned in the slots. There are further back beams extending in the axial direction along the outer surface of the stator core. The back beams are welded to the outer surface of the stator core. The stator frame comprises normally end constructions and frame plates between the end constructions. The stator frame can be manufactured simultaneously with the stator core. The stator frame can then be installed on the stator core when the stator core is ready.

The stator frame is in prior art solutions attached via support elements to the support structure. The support elements are attached by welding to the stator frame and to the support structure by bolts.

The stator core is in prior art solutions also attached to the stator frame by welding. This is done e.g. by using C-formed clamps that are positioned on the back beams on the outer surface of the stator core. The C-clamps are then welded to the stator frame and to the back beams on the stator core. The stator core is first positioned in the correct position in relation to the stator frame before the welding is done.

The use of welding for attaching the stator core to the stator frame and for attaching the support elements to the stator frame is, however, problematic especially in generator applications where the generator is driven by a combustion engine. The combustion engine produces heavy vibrates to the common support structure and thereby also to the electric generator. The electric generator will thus work in a constantly vibrating environment. These vibrations will cause a heavy load on the welded joints during the long lifespan of the generator. The number of vibrations that an electric machine is subjected to during its lifetime is in the order of $10^9$. The great number of vibrations is problematic for welded joints, which might at some point brake due to these vibrations. It has in fact been observed that these vibrations have caused braking of the welded joints in some circumstances. The welded joints between the stator frame and the support elements are weak points in the construction as the moment of inertia of the stator is transferred from the stator to the support structure through these joints.

There is thus a need to find a solution to the problem of welded joints that might brake due to vibrations.

U.S. Pat. No. 4,207,484 discloses an electric machine comprising a rotor and a stator surrounding the rotor. The stator laminations are compressed between two opposing press rings which are secured by a plurality of draw bolts that are threaded and provided with nuts. The stator rests on two axially orientated stator support members. The support members include a horizontal supporting plate that supports a sole that is affixed to the upper radial projections of the press rings. More particularly each sole is connected in a force-transmitting manner to the stator core by a number of supports that may be welded or otherwise affixed between the sole and adjacent draw bolts of the stator core. Each sole is attached to its corresponding supporting plate by a plurality of bolts that are screwed to the supporting plate. Thus a rigid supporting connection is provided between the support members and the stator core.

U.S. Pat. No. 102,406 discloses an electric machine comprising a rotor and a stator surrounding the rotor. The stator is supported with support feets made of cast iron on a support structure.

U.S. Pat. No. 1,689,503 discloses an electric machine comprising a rotor, a stator surrounding the rotor and a support structure. The stator is construed in four parts i.e. an annular structure, foot members, and a cover structure which is made in two parts secured together. The annular structure comprises a plurality of axially space apart annular members extending around the whole perimeter of the cylindrical stator core. The annular members are connected by axially on the inner perimeter of the annular members extending first tie bars and by axially extending on the outer perimeter of the annular members extending second tie bars. The first axially extending tie bars are attached to the outer perimeter of the stator core. Each foot member comprises a plurality of curved plates spaced apart which are secured, preferably by welding, to a base plate and a side plate. The curved plates extend only over a certain angle along the perimeter of the annular structure. The curved plates are bolted to the annular members. The cover structure comprises two parts secured together with bolts. The cross section of the cover structure has a curved form so that it can be fitted as a cover on the annular structure and the foot member.

BRIEF DESCRIPTION OF THE INVENTION

An object of the present invention is to achieve an electric machine where the problems related to welded joints are eliminated or at least delimited.

The electric machine according to the invention is characterized by what is stated in the characterizing portion of claim 1.

The electric machine comprises a rotor, a stator surrounding the rotor and a support structure, said stator having a longitudinal centre axis, a horizontal centre plane passing through the centre axis of the stator, and a vertical centre plane passing through the centre axis of the stator, said stator being supported on the support structure with support elements located symmetrically on opposite sides of the vertical centre plane, said stator comprising a cylindrical stator core having a laminated structure and slots for a stator winding.

The electric machine is characterized in that:

the stator comprises a stator frame surrounding the stator core, said stator frame comprising two opposite end constructions located at an axial distance from each other and at least one frame plate located between the end constructions, a support element is located between each end construction and the adjacent frame plate and between adjacent frame plates, said support elements being made of cast iron and being attached on the one hand to the end constructions and the frame plate with fastening means based on a compression joint and on the other hand to the support structure with fastening means based on a compression joint, whereby the stator frame becomes attached to the support structure via the support elements.

The welded joints in the fastening arrangement between the stator frame and the support elements are eliminated with the use of support elements made of cast iron and fastening means based on compression joints. This new fastening arrangement between the stator frame and the support structure will not brake due to vibrations caused by the combustion engine. Support elements made of cast iron and fastening means based on compression joints can easily withstand the number of $10^9$ vibrations during the life time of the electric machine.

The use of cast iron makes it possible to achieve any suitable form of the support elements rather easily. The form of the support elements can thus be optimized so that tension concentrations are eliminated. The slopes of the SN-curves for cast iron are also very gentle compared to the corresponding slopes of welded structures. The fatigue resistance is thus much higher for cast iron compared to the fatigue resistance for welded structures.

The stator core can be attached to the stator frame with fastening brackets having a first end and a second end. Each end has at least one opening. A first end is attached to the stator frame and a second end is attached to the stator core by means of fastening means based on a compression joint. The fastening means pass through the openings at the ends of the support bracket. A compression joint can be achieved with bolts and nuts.

The nuts in the fastening means can be provided with friction increasing means in order to prevent loosening of the nuts due to vibrations. Another possibility is to use resilient washers under the nuts.

The fastening brackets and the fastening means can advantageously be dimensioned to allow the rotor core to be centralized in the axial and the radial direction in relation to the stator frame before the fastening means are tightened. There are no exactly machined surfaces between the stator core and the stator frame, which could be used for the centralization. Such exactly machined surfaces are rather costly to produce and they are therefore avoided if possible.

BRIEF DESCRIPTION OF THE DRAWINGS

In the following the invention will be described in greater detail by means of preferred embodiments with reference to the attached drawings, in which FIG. 8 shows a second axonometric view of a fastening arrangement between the stator core and the stator frame, FIG. 9 shows fastening means that can be used in the fastening arrangements in the electric machine, FIG. 10 shows a second embodiment of a fastening bracket that can be used in the fastening arrangements in the electric machine.

DETAILED DESCRIPTION OF EMBODIMENTS OF THE INVENTION

Figure 1:
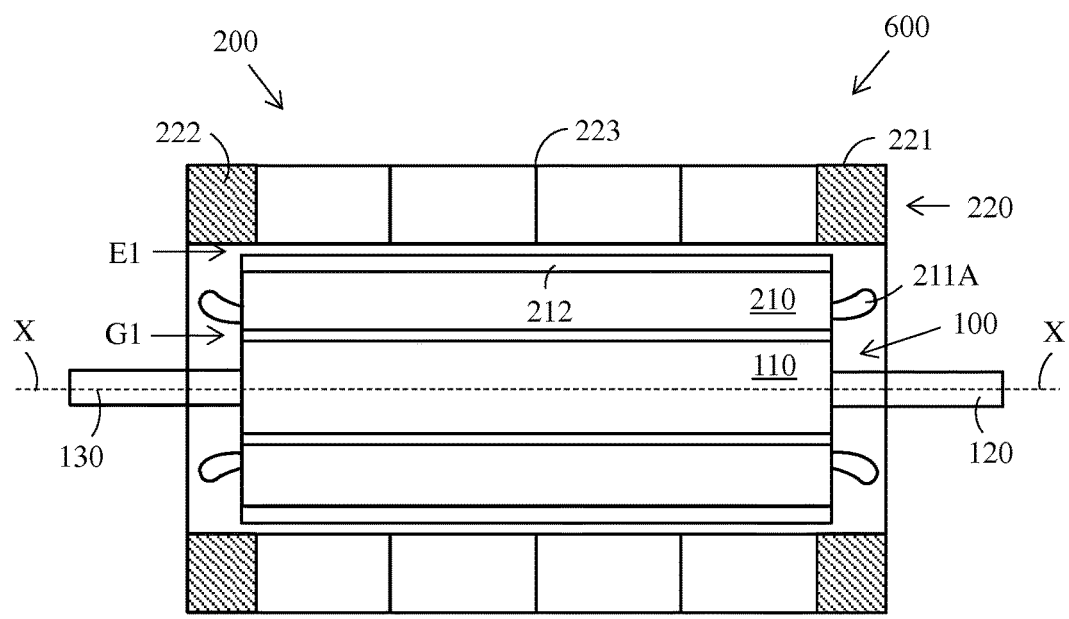
FIG. 1 shows a longitudinal cross section of an electric machine.

FIG. 1 shows a longitudinal cross section of an electric machine. The electric machine 600 comprises a longitudinal centre axis X-X, a cylindrical rotor 100 and a cylindrical stator 200 surrounding the rotor 100.

The rotor 100 comprises a centre portion 110 provided with a rotor winding (not shown in the figure) and two end portions 120, 130 at each axial X-X end of the centre portion 110. Each end portion 120, 130 of the rotor 100 is rotatably supported with a bearing (not shown in the figure) on a support structure 500 (shown in FIG. 4) of the electric machine 600.

The stator 200 comprises a stator core 210 and a stator frame 220 surrounding the stator core 210. The stator frame 220 comprises two opposite end constructions 221, 222 located at an axial X-X distance from each other. The stator frame 220 comprises further stator plates 223 located between the end constructions 221, 222. The stator plates 223 are located at an axial X-X distance from each other along the centre axis X-X of the electric machine 600. The stator core 210 has slots provided with a stator winding and back beams 212 attached to the outer surface of the stator core 210. The figure shows the winding ends 211A of the stator winding.

There is a clearance E1 between the outer surface of the back beams 212 and the inner surface of the stator frame 220. There is further an air gap G1 between the outer surface of the middle portion 110 of the rotor 100 and the inner surface of the stator core 210.

The electric machine 600 can be an electric motor or an electric generator.

Figure 2:
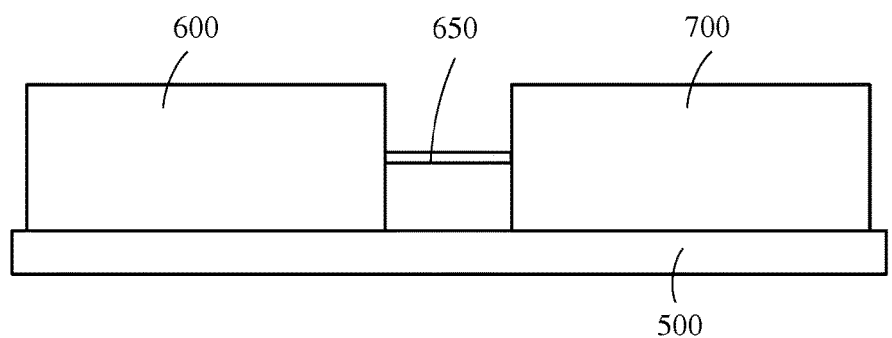
FIG. 2 shows an electric generator and a diesel engine mounted on a common support structure.

FIG. 2 shows an electric generator and a combustion engine mounted on a common support structure. The electric generator 600 is mounted on a common support structure 500 with a combustion engine 700. The combustion engine 700 drives the electric generator 600 through a shaft 650.

Figure 3:
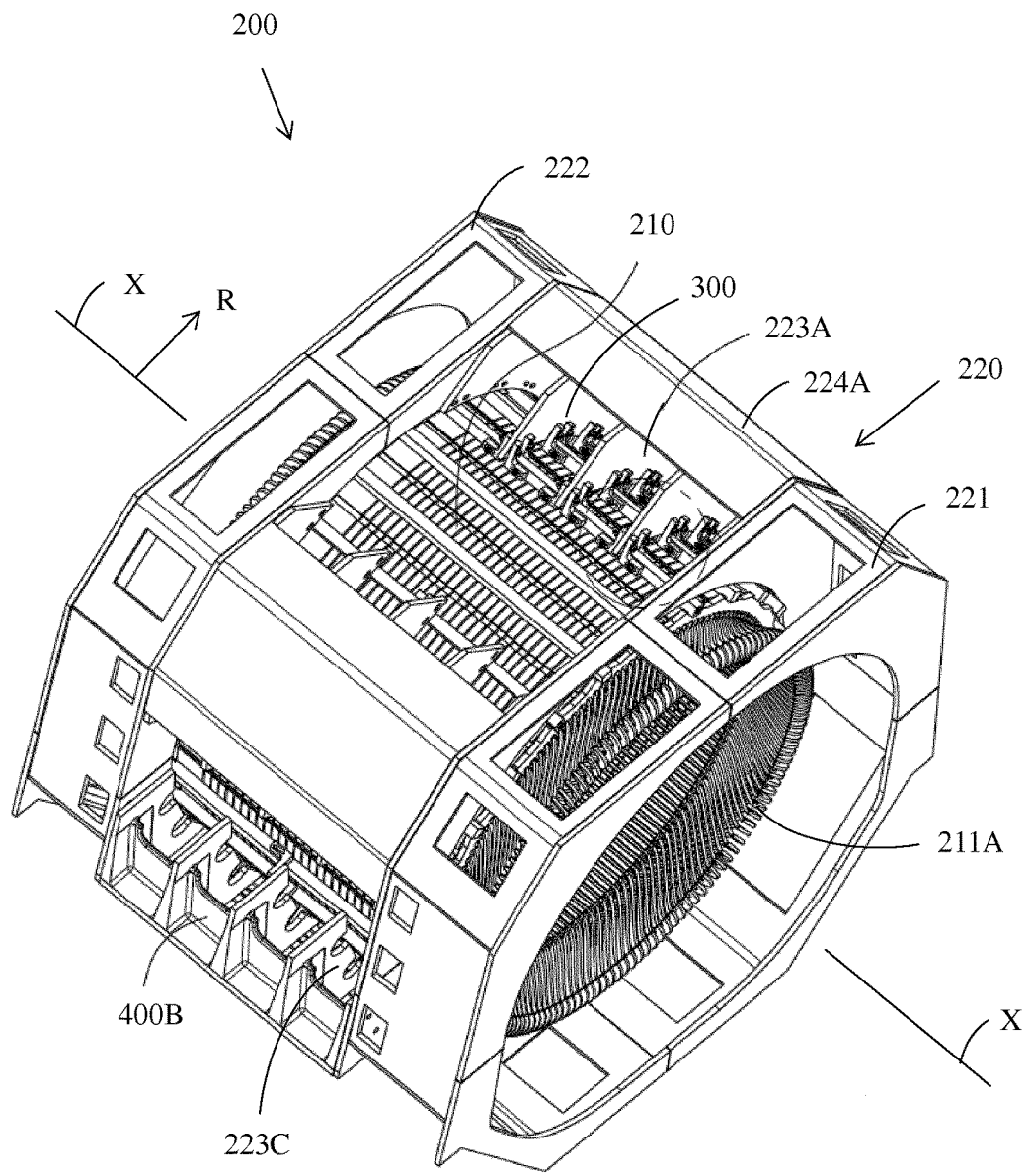
FIG. 3 shows an axonometric view of a stator.
Figure 4:
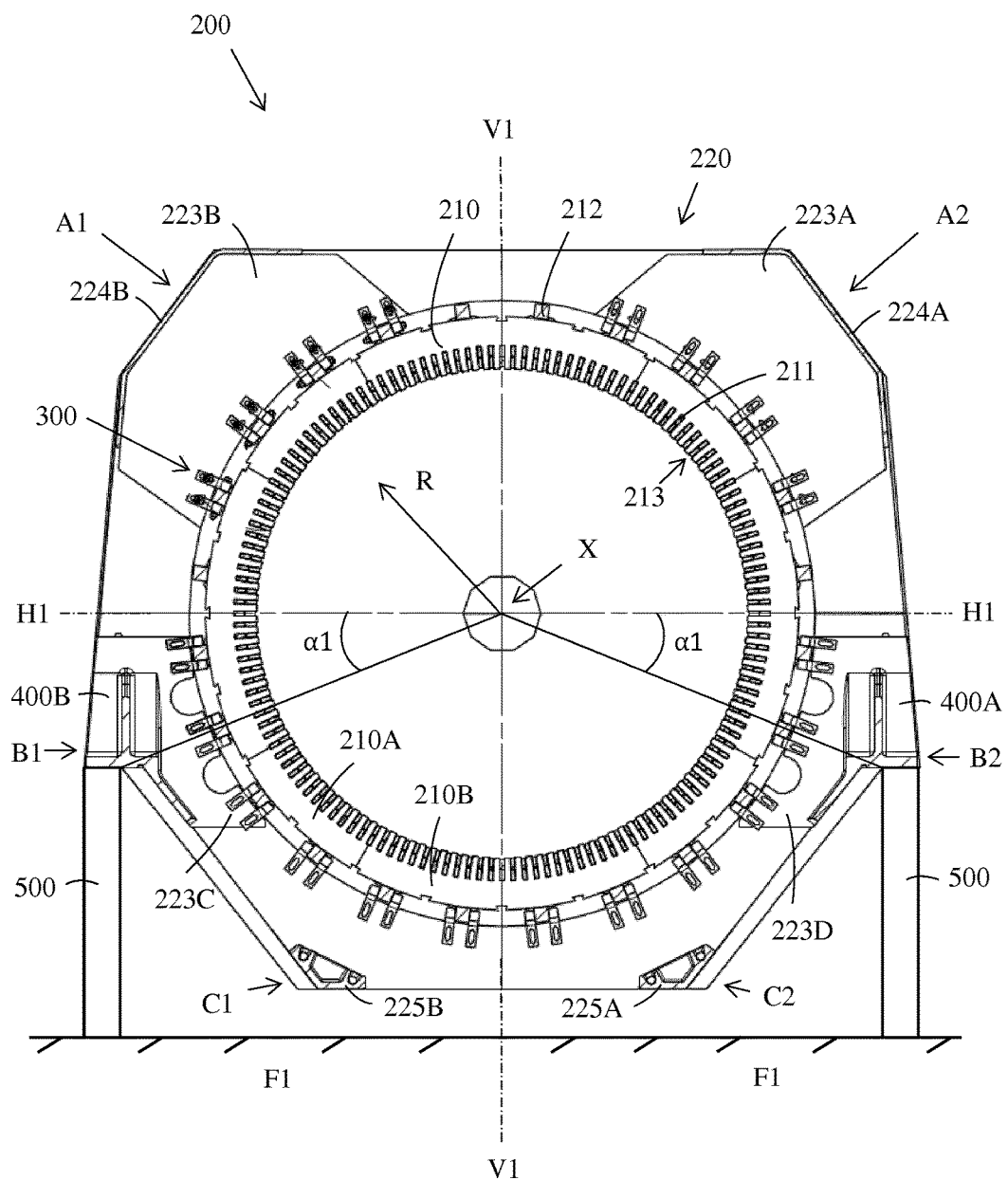
FIG. 4 shows a traverse cross section of the stator.
Figure 5:
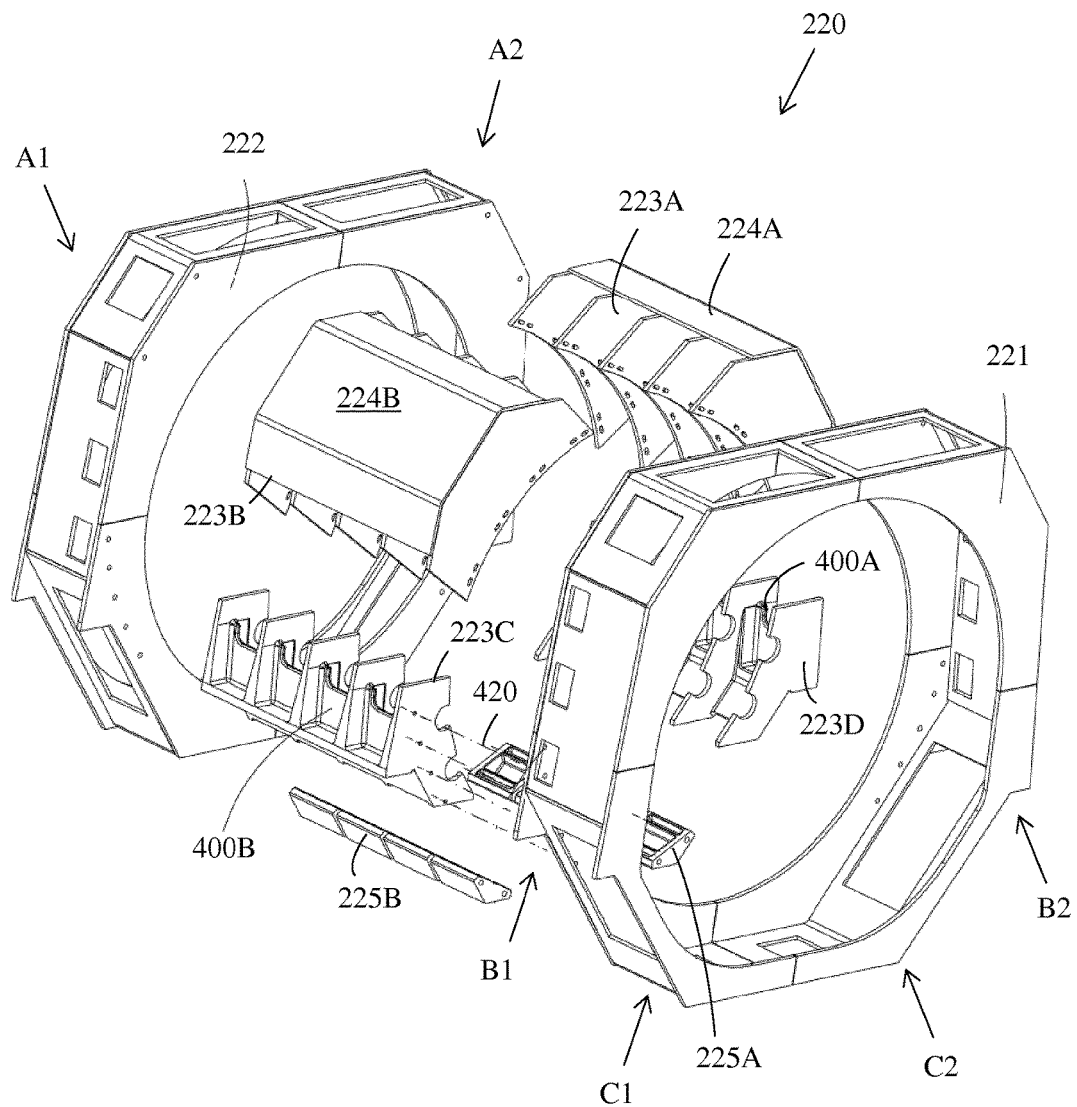
FIG. 5 shows an exploded view of the stator frame.

FIG. 3 shows an axonometric view of a stator, FIG. 4 shows a traverse cross section of the stator, and FIG. 5 shows an exploded view of the stator frame.

The stator 200 has a longitudinal centre axis X-X coinciding with the longitudinal centre axis X-X of the electric machine 600. The stator 200 has further a horizontal centre plane H1-H1 passing through the centre axis X-X, a vertical centre plane V1-V1 passing through the centre axis X-X, and a radial direction R being perpendicular to the centre axis X-X. The stator 200 comprises a stator core 210 and a stator frame 220 surrounding the stator core 210.

The stator core 210 comprises slots 213 penetrating into the stator core 210 from the inner perimeter of the stator core 210. The slots 213 in the stator core 210 receive a stator winding 211. The stator core 210 has a laminated structure i.e. it is composed of annular sheets that are stacked together to form the stator core 210. Each sheet in the stator core 210 is made of sectors 210A, 210B, whereby the sectors 210A, 210B are attached to each other in order to form a closed perimeter. The stator core 210 comprises further back beams 212 attached to the outer surface of the stator core 210 and extending in the axial X-X direction of the stator 200. The back beams 212 are attached by welding to the outer surface of the stator core 210. The stator core 210 has a cylindrical form.

The stator frame 220 comprises two opposite end constructions 221, 222 located at an axial X-X distance from each other. The stator frame comprises further frame plates 223, 223A, 223B, 223C, 223D between the end constructions 221, 222. Each frame plate 223 is formed of four separate sectors 223A, 223B, 223C, 223D. Two sectors of frame plates 223A, 223B are positioned symmetrically at both sides of the vertical centre line V1-V1 in the upper corners A1, A2 of the stator frame 220. Two sectors of frame plates 223C, 223D are positioned symmetrically at both sides of the vertical centre line V1-V1 in the lower corners B1, B2 of the stator frame 220. The two sectors of frame plates 223A, 223B in the upper corners A1, A2 of the stator frame 220 are connected to each other with a connection part 224A, 224B. Each connection part 224A, 224B extends along the outer perimeter of the respective frame plate 223A, 223B. The connection part 224A, 224B and the frame plates 223A, 223B form a frame plate package 223A, 224A, 223B, 224B.

The stator frame 220 comprises further a package of first intermediate parts 225A, 225B located symmetrically at opposite sides of the vertical centre plane V1-V1 in both lowermost corners C1, C2 of the stator frame 220.

The stator frame 220 comprises further support elements 400A, 400B located symmetrically at both sides of the vertical centre line V1-V1 in the lower corners B1, B2 of the stator frame 220. A frame plate 223C, 223D is attached to each vertical side surface of each support element 400A, 400B. The support elements 400A, 400B are located symmetrically at the outer perimeter of the stator frame 220. The support elements 400A, 400B are in this embodiment located entirely below the horizontal centre plane H1-H1 of the stator 200. The support elements 400A, 400B are advantageously located at an angle α1 below the horizontal centre plane H1-H1 of the stator 200. The angle α1 is advantageously in the range 10 to 45 degrees. The support elements 400A, 400B could, however, instead be located at least partly above the horizontal centre plane H1-H1. The support elements 400A, 400B and the frame plates 223C, 223D between the support elements 400A, 400B form a support element package. The support element package can be formed as one entity.

The axial X-X ends of the frame plate packages 223A, 224A, 223B, 224B and the axial X-X ends of the support element packages 400A, 223C, 400B, 223D as well as the axial X-X ends of the packages of the first intermediate parts 225A, 225B are attached to a respective end construction 221, 222 with fastening means 420 based on a compression joint. The inner perimeter of the stator frame 220 has a circular form. The outer perimeter of the stator frame 220 has a polygonal form.

The stator core 210 and the stator frame 220 can thus be manufactured independently simultaneously. The annular sheets of the stator core 210 are assembled to form the complete stator core 210 and then the stator winding 211 is wound into the slots 213 in the stator core 210. The end constructions 221, 222, the frame plates 223A, 223B, 223C, 223D, the support elements 400A, 400B and the first intermediate parts 225A, 225B are assembled to form the complete stator frame 220. The stator core 210 is then attached to the stator frame 220 with a fastening arrangement 300, which is explained more in detail in connection with FIGS. 7 and 8.

The stator 200 is supported on a support construction 500 of the electric machine with the support elements 400A, 400B. The support construction 500 is supported on the floor F1 on the site. The support elements 400A, 400B are attached to the support construction 500 with fastening means based on a compression joint. The angle α1 is measured from the support surface of the support element 400A, 400B i.e. the surface with which the support element 400A, 400B is supported on the support structure 500.

Figure 6:
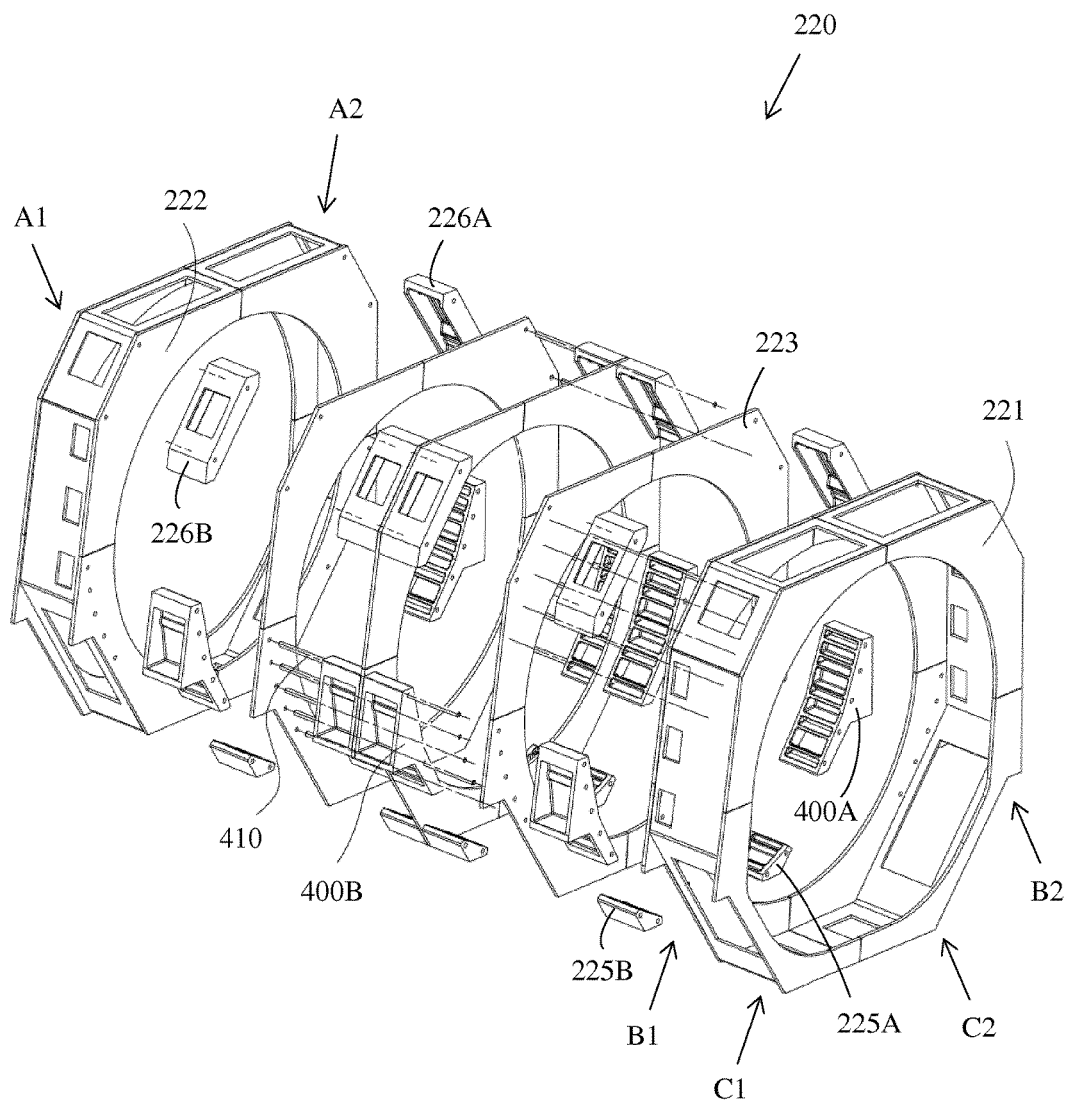
FIG. 6 shows an exploded view of an alternative stator frame.

FIG. 6 shows an exploded view of an alternative stator frame construction. The stator frame 220 comprises two end constructions 221, 222 and frame plates 223 between the end constructions 221, 222. The four separate frame plates 223A, 223B, 223C, 223D shown in FIG. 5 are in FIG. 6 expanded so that their edges attach each other forming a frame plate 223 that forms a continuous annular construction surrounding the stator core 210. The frame plates 223 form thus discs extending around the whole stator core 210. There are second intermediate parts 226A, 226B located symmetrically at opposite sides of the vertical centre plane V1-V1 in both upper corners A1, A2 of the stator frame 220. The second intermediate plates 226A, 226B are located between each end construction 221, 222 and an adjacent frame plate 223 and between adjacent frame plates 223. There are further support elements 400A, 400B located symmetrically at opposite sides of the vertical centre plane V1-V1 in both lower corners B1, B2 of the stator frame 220. The support elements 400A, 400B are located between each end construction 221, 222 and an adjacent frame plate 223 and between adjacent frame plates 223. There are further first intermediate parts 225A, 225B located symmetrically at both sides of the vertical centre plane V1-V1 in both lowermost corners C1, C2 of the stator frame 220. The first intermediate parts 225A, 225B are located between each end construction 221, 222 and an adjacent frame plate 223 and between adjacent frame plates 223. The stator frame 220 is held together with rods 410 extending in the axial direction X-X through the whole stator frame 220. The rods 410 in the lowermost corners C1, C2 of the stator frame 220 extend through holes in the frame plates 223 and the first intermediate parts 225A, 225B. The rods 410 in the lower corners B1, B2 of the stator frame 220 extend through holes in the frame plates 223 and holes in the support elements 400A, 400B. The rods 410 in the upper corners C1, C2 of the stator frame 220 extend through holes in the frame plates 223 and holes in the second intermediate parts 226A, 226B. The rods 410 are provided with a threading on both ends. The nuts tighten the rods 410 to the end constructions 221, 222.

Figure 7:
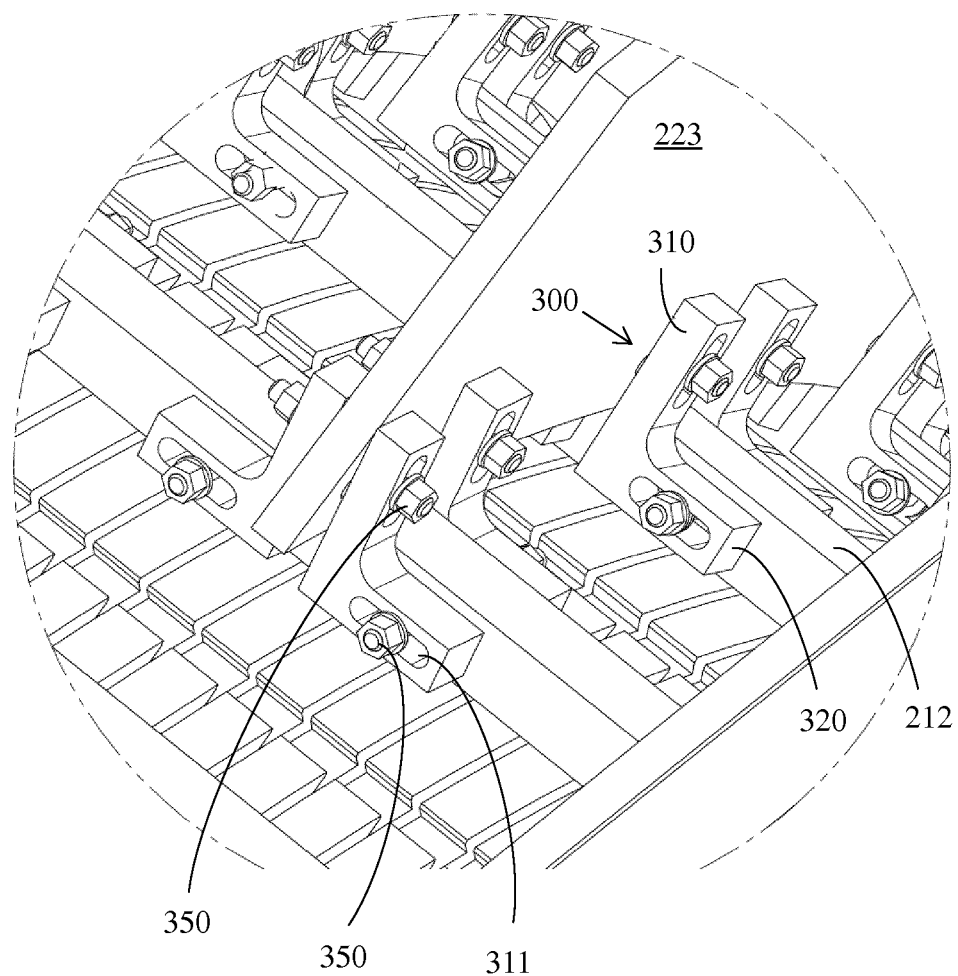
FIG. 7 shows a first axonometric view of a fastening arrangement between the stator core and the stator frame.

FIG. 7 shows a first axonometric view and FIG. 8 shows a second axonometric view of a fastening arrangement between the stator core and the stator frame.

The stator core 210 is attached to the stator frame 220 with fastening brackets 300 comprising two ends 310, 320, each end 310, 320 forming a branch 310, 320. The two branches 310, 320 are perpendicular to each other. Each branch 310, 320 in the fastening bracket 300 comprises at least one opening 311 for receiving fastening means 350 based on a compression joint. The diameter of the openings 311 could be a little bit bigger than the diameter of the fastening means 350 passing through the opening 311. The openings 311 could on the other hand have an elongated form or some other suitable form allowing a small movement of the stator core 210 in relation to the stator frame 220 when the fastening means 350 are positioned in the openings 311. This allows the stator core 210 to be centralized in the radial direction R and the axial direction X-X in relation to the stator frame 220 before the fastening means 350 are tightened in order to lock the stator core 210 to the stator frame 220. The stator core 210 is attached to the stator frame 220 with the fastening brackets 300 at the frame plates 223 and at the end constructions 221, 222. There are four fastening brackets 300 in the joint between each back beam 212 and each frame plate 223. The fastening brackets 300 are positioned on opposite sides of the back beam 212 and on opposite sides of the frame plate 223. A second branch 320 of the fastening bracket 300 is positioned against the outer surface of the stator core 210 and a first branch 310 of the fastening bracket 300 is positioned against the side surface of the frame plate 223. The second branches 320 of the fastening brackets 300 at opposite sides of the back beam 212 are attached to each other and to the back beam 212 with fastening means 330 passing horizontally through the horizontal branches 320 of the fastening brackets 300 and the back beam 212. The first branches 310 of the fastening brackets 300 at opposite sides of the frame plate 223 are attached to each other and to the frame plate 223 with fastening means 350 passing horizontally through the first branches 310 of the fastening bracket 300 and the frame plate 223. The fastening brackets 300 are naturally also used in a corresponding way to attach the stator core 210 to the end constructions 221, 222 of the stator frame 220. The first branches 310 of the fastening brackets 300 are vertical and the second branches 320 of the fastening brackets 300 are horizontal.

FIG. 8 shows the clearance E1 between the outer surface of the back beam 212 and the inner surface of the stator frame 220. This clearance E1 is needed in order to be able to centralize the stator core 210 to the stator frame 220. The figure also shows that the back beam 212 is welded W to the outer surface of the stator core 210.

FIG. 9 shows fastening means that can be used in the fastening arrangements in the electric machine. The fastening means 350 can be used to attach the fastening brackets 300 to the frame plates 223, 223A, 223B, 223C, 223D to the back beams 212 and to the end constructions 221, 222. The fastening means 350 can also be used to attach the support elements 400A, 400B to the support structure 500. The fastening means 350 are based on a compression joint. A compression joint can be realized with a bolt 351 and a nut 352 that is threaded on the free end of the bolt 351. The nut 353 at the other end of the bolt 351 is normally permanently attached to the bolt 351 or forms a part of the bolt 351. The compression joint could also be realized with a rod having threads at least at both opposite end portions of the rod. There would thus be a nut at each end of the rod.

FIG. 10 shows a second embodiment of a fastening bracket that can be used in the fastening arrangements in the electric machine. This fastening bracket 300 comprises a first end 310 and a second end 320. The first end 310 of the fastening bracket 300 comprises two openings 311 and the second end 320 of the fastening bracket 300 comprises one opening 311, which is directed in a direction being perpendicular to the direction of the openings 311 in the first end 310 of the fastening bracket 300. The first end 310 of the fastening bracket 300 can be attached to the stator frame 220 and the second end 320 of the fastening bracket 300 can be attached to the stator core 210 i.e. to the back beam 212.

The figures show two separate fastening brackets 300 at each side of the back beam 212, but they could naturally be connected to each other e.g. from the top of the first branches 310 of the fastening brackets 300. The two fastening brackets 300 would still form a fastening bracket 300 with two ends i.e. two branches. The first branch 310 in the two fastening brackets 300 could e.g. be formed as a half circle. The two second branches 320 would be attached to opposite sides of the half circle. The half circle could have a slot for the back beam 212.

Each fastening bracket 300 comprises two ends 310, 320. The two ends 310, 320 are formed by two branches 310, 320 in the first embodiment of the fastening bracket 300. The two branches 310, 320 are advantageously perpendicular to each other. The two branches 310, 320 have thus the form of a letter L. The essential thing here is that the fastening bracket 300 comprises a first end 310 that can be attached to the stator frame 220 and a second end 320 that can be attached to the stator core 210. The form and the construction of the branches 310, 320 does not as such matter.

The nut 352 could be provided with friction increasing means in order to prevent loosening of the nut 352 due to vibrations. The fastening means 350 could also be provided with resilient washers under the nut 352 in order to eliminate loosening of the nut 352 due to vibration.

The embodiment of the stator frame 220 shown in FIG. 6 comprises separate support elements 400A, 400B. This means that each support element 400A, 400B is a separated entity. These separate support elements 400A, 400B are advantageously made in a casting process from cast iron. A suitable material for the support elements 400A, 400B is GJS-400.

The embodiment of the stator frame 220 shown in FIG. 5 comprises an arrangement where the support elements 400A, 400B form a support element package together with the frame plates 223C, 223D. The whole support element package 400A, 223C, 400B, 223D at each lower corner B1, B2 in the stator frame 220 are advantageously made as one entity in a casting process from cast iron.

The axial X-X length of the stator 200 determines the amount of frame plates 223, 223A, 223B, 223C, 223D that are needed between the end constructions 221, 222. A very short stator 200 could be constructed even without frame plates 223, 223A, 223B, 223C, 223D between the end constructions 221, 222. The stator 200 is attached to the support structure 500 of the electric machine with the support elements 400A, 400B. The support elements 400A, 400B transfer the torque from the stator frame 220 to the support structure 500.

The figures show only one fastening means 350 at each end 310, 320 of the fastening bracket 300. There could naturally be two or more fastening means 350 in each end 310, 320 of the fastening bracket 200.

The stator core 210 is advantageously attached to the stator frame 220 with fastening brackets 300 and fastening means 350 based on a compression joint. It is, however, possible to attach the stator core 210 to the stator frame 220 also in the conventional way i.e. through welding.

The back beams 212 are attached to the stator core 210 by welding, but they could be attached to the stator core 210 e.g. through a fishtail type fastening.

The fastening of the support bracket 300 to the stator core 210 is done via back beams 212 welded to the outer surface of the stator core 210 in the figures. Another possibility is to weld small plates onto the outer surface of the stator core 210. The plate could be provided with a radially directed threaded hole. The fastening bracket 300 could then be attached to the stator core 210 with radially extending bolts passing through the second branch 320 of the fastening bracket 300. The back beams 212 and the plates welded to the outer surface of the stator core 210 form support means for the support brackets 300.

A compression joint between two parts is advantageously achieved by using a bolt and a nut as fastening means. The bolt and the nut form a compression joint between the parts that are to be attached together. The compression joint could also be called a threaded joint when a bolt and a nut are used as fastening means. A compression joint could also be achieved e.g. with a heated rivet, which forms a compression joint between the parts that are to be attached together when the rivet cools down.

It will be obvious to a person skilled in the art that, as the technology advances, the inventive concept can be implemented in various ways. The invention and its embodiments are not limited to the examples described above but may vary within the scope of the claims.

The invention claimed is:

1. An electric machine comprises a rotor, a stator surrounding the rotor and a support structure, said stator having a longitudinal centre axis, a horizontal centre plane passing through the centre axis of the stator, and a vertical centre plane passing through the centre axis of the stator, said stator being supported on the support structure with support elements located symmetrically on opposite sides of the vertical centre plane, said stator comprising a cylindrical stator core having a laminated structure and slots for a stator winding,
wherein:
the stator comprises a stator frame surrounding the stator core, said stator frame comprising two opposite end constructions located at an axial distance from each other and at least one frame plate located between the end constructions,
each frame plate is formed of four separate sectors so that two frame plate sectors are located symmetrically at both sides of the vertical centre line in upper corners of the stator frame and two frame plate sectors are located symmetrically at both sides of the vertical centre line in lower corners of the stator frame, the two sectors of frame plates in the upper corners of the stator frame being connected to each other with a connection part in order to form a first frame plate package,
a support element is located between each end construction and the adjacent frame plate and between adjacent frame plates, said support elements being made of cast iron and being attached on the one hand to the end constructions and the frame plate with fastening means based on a compression joint and on the other hand to the support structure with fastening means based on a compression joint, whereby the stator frame becomes attached to the support structure via the support elements.

2. An electric machine according to claim 1, wherein the support elements and the frame plates in each lower corner of the stator frame are attached to each other in order to form a support element package, whereby each end of the support element package is attached to a respective end construction of the stator frame.

3. An electric machine according to claim 2, wherein the stator frame comprises further first intermediate parts located symmetrically at opposite sides of the vertical centre plane in lowermost corners of the stator frame.

4. An electric motor according to claim 3, wherein the stator core is attached to the stator frame with fastening brackets having a first end and a second end, each end having at least one opening, whereby the first end is attached to the stator frame and the second end is attached to the stator core by means of fastening means based on a compression joint, said fastening means passing through the openings in the fastening brackets, whereby the openings and the fastening means are dimensioned to allow the stator core to be centralized in the radial direction and the axial direction in relation to the stator frame before the fastening means are tightened in order to lock the stator core to the stator frame.

5. An electric motor according to claim 2, wherein the stator core is attached to the stator frame with fastening brackets having a first end and a second end, each end having at least one opening, whereby the first end is attached to the stator frame and the second end is attached to the stator core by means of fastening means based on a compression joint, said fastening means passing through the openings in the fastening brackets, whereby the openings and the fastening means are dimensioned to allow the stator core to be centralized in the radial direction and the axial direction in relation to the stator frame before the fastening means are tightened in order to lock the stator core to the stator frame.

6. An electric machine according to claim 1, wherein the four frame plate sectors are expanded so that their edges attach each other forming a continuous annular frame plate surrounding the stator core.

7. An electric machine according to claim 6, wherein the stator frame comprises further first intermediate parts located symmetrically on opposite sides of the vertical centre plane in lowermost corners of the stator, a first intermediate part being located between each end construction and the adjacent frame plate and between adjacent frame plates.

8. An electric machine according to claim 7, wherein the stator frame comprises further second intermediate parts located symmetrically on opposite sides of the vertical centre plane in upper corners of the stator, a second intermediate part being located between each end construction and the adjacent frame plate and between adjacent frame plates.

9. An electric motor according to claim 7, wherein the stator core is attached to the stator frame with fastening brackets having a first end and a second end, each end having at least one opening, whereby the first end is attached to the stator frame and the second end is attached to the stator core by means of fastening means based on a compression joint, said fastening means passing through the openings in the fastening brackets, whereby the openings and the fastening means are dimensioned to allow the stator core to be centralized in the radial direction and the axial direction in relation to the stator frame before the fastening means are tightened in order to lock the stator core to the stator frame.

10. An electric machine according to claim 6 wherein the stator frame comprises further second intermediate parts located symmetrically on opposite sides of the vertical centre plane in upper corners of the stator, a second intermediate part being located between each end construction and the adjacent frame plate and between adjacent frame plates.

11. An electric motor according to claim 6, wherein the stator core is attached to the stator frame with fastening brackets having a first end and a second end, each end having at least one opening, whereby the first end is attached to the stator frame and the second end is attached to the stator core by means of fastening means based on a compression joint, said fastening means passing through the openings in the fastening brackets, whereby the openings and the fastening means are dimensioned to allow the stator core to be centralized in the radial direction and the axial direction in relation to the stator frame before the fastening means are tightened in order to lock the stator core to the stator frame.

12. An electric machine according to claim 11, wherein the fastening brackets comprises two branches that are perpendicular to each other, whereby a first branch forms a first end of the fastening bracket and a second branch forms a second end of the support bracket.

13. An electric motor according to claim 1, wherein the stator core is attached to the stator frame with fastening brackets having a first end and a second end, each end having at least one opening, whereby the first end is attached to the stator frame and the second end is attached to the stator core by means of fastening means based on a compression joint, said fastening means passing through the openings in the fastening brackets, whereby the openings and the fastening means are dimensioned to allow the stator core to be centralized in the radial direction and the axial direction in relation to the stator frame before the fastening means are tightened in order to lock the stator core to the stator frame.

14. An electric machine according to claim 13, wherein the fastening brackets comprises two branches that are perpendicular to each other, whereby a first branch forms a first end of the fastening bracket and a second branch forms a second end of the fastening bracket.

15. An electric machine according to claim 14, wherein the electric machine comprises further back beams being attached to an outer surface of the stator core and extending in the axial direction of the stator, said second branch of the fastening brackets being attached to the back beams.

16. An electric machine according to claim 13, wherein the electric machine comprises further back beams being attached to an outer surface of the stator core and extending in the axial direction of the stator, said second branch of the fastening brackets being attached to the back beams.

17. An electric machine according to claim 16, wherein the fastening brackets are positioned on both sides of the back beams and on both sides of the frame plate so that a second branch of the fastening bracket rests on the outer surface of the stator core and a first branch of the fastening bracket rests on the frame plate, whereby
the first branches of two opposite fastening brackets on both sides of the frame plate are attached to the frame plate with a fastening means based on a compression joint,
the second branches of two opposite fastening brackets on both sides of the back beam are attached to the back beam with fastening means based on a compression joint.

* * * * *